MAGNETIC PULSE CONTROLLING DEVICE

Original Filed Dec. 17, 1953 12 Sheets-Sheet 1

INVENTORS
John D. Goodell
Tenny Lode
BY Bailey, Stephens & Huettig
ATTORNEYS

INVENTORS
John D. Goodell
Tenny Lode
BY Bailey, Stephens & Huettig
ATTORNEYS

MAGNETIC PULSE CONTROLLING DEVICE

Original Filed Dec. 17, 1953 12 Sheets-Sheet 3

INVENTORS
John D. Goodell
Tenny Lode
BY Bailey, Stephens & Huettig
ATTORNEYS

INVENTORS
John D. Goodell
Tenny Lode
BY
Bailey, Stephens & Huettig
ATTORNEYS

INVENTORS
John D. Goodell
Tenny Lode
BY Bailey, Stephens & Huettig
ATTORNEYS

INVENTORS
John D. Goodell
Tenny Lode
BY Bailey, Stephens & Huettig
ATTORNEYS

INVENTORS
John D. Goodell
Tenny Lode
BY
Bailey, Stephens & Huettig
ATTORNEYS

INVENTORS
John D. Goodell
Tenny Lode
BY
Bailey, Stephens & Huettig
ATTORNEYS

INVENTORS
John D. Goodell
Tenny Lode
BY
Bailey, Stephens & Huettig
ATTORNEYS

INVENTORS
John D. Goodell
Tenny Lode
BY
Bailey, Stephens & Huettig
ATTORNEYS

MAGNETIC PULSE CONTROLLING DEVICE

Original Filed Dec. 17, 1953 12 Sheets-Sheet 11

INVENTORS
John D. Goodell
Tenny Lode
BY Bailey, Stephens & Huettig
ATTORNEYS

INVENTORS
John D. Goodell
Tenny Lode
BY
Bailey, Stephens & Huettig
ATTORNEYS

United States Patent Office 2,914,753

Patented Nov. 24, 1959

2,914,753

MAGNETIC PULSE CONTROLLING DEVICE

John D. Goodell and Tenny Lode, St. Paul, Minn., assignors, by mesne assignments, to Librascope, Incorporated, a corporation of California Continuation of application Serial No. 398,658, December 17, 1953. This application September 1, 1955, Serial No. 531,874

16 Claims. (Cl. 340—174)

This application is a continuation of application Serial Number 398,658, filed December 17, 1953.

This invention relates to a computing machine. In particular, the invention is directed to a binary digital computing machine using magnetic pulse controlling elements for receiving, storing and emitting information.

In computing machines, elements have been used which are composed of a magnetic core which is magnetized by a single incoming signal pulse, and from which an output signal pulse is taken. Such elements have heretofore simply been used as delay or power gain elements in the operation of the computing machine. These elements have not had the quality of making any complex decisions inasmuch as they have been supplied from but one input signal source, whereas to make a complex decision, each element must be supplied with input signals from at least two separate information or intelligence sources.

An object of the instant invention is to use a circuit including magnetic pulse-storing elements in a computing machine for the purpose of receiving intelligence symbolized by pulses from at least two separate information sources, and generating an output as a function of this intelligence.

A second object of the invention is to produce a circuit including such elements which are capable of generating an output corresponding to one extreme of a binary system of symbols if, and only if, it receives such a symbol on one or more of its input lines.

A third object of the invention is to produce a circuit including such elements which are capable of generating an output corresponding to one extreme of a binary system of symbols, if, and only if, it does not receive such a symbol from one or more of its input lines.

A fourth object of the invention is to produce a system using a circuit including such elements which are capable of generating an output corresponding to one extreme of a binary system of symbols if, and only if, it receives such a symbol on one or more of its input lines, in combination with a circuit including such elements which are capable of handling the same binary symbolic system, and upon receiving a symbol corresponding to one extreme of said binary symbolic system generating an output corresponding to the opposite extreme of said binary symbolic system.

A fifth object of the invention is to produce a system using a circuit including such elements which are capable of generating an output corresponding to one extreme of a binary system of symbols if, and only if, it receives such a symbol on one or more of its input lines, in combination with a circuit including such elements which are capable of generating an output corresponding to one extreme of a binary system of symbols if, and only if, it does not receive such a symbol on one or more of its input lines.

In general these objects are obtained by using a magnetizable core having a substantially rectangular hysteresis curve and provided with an input pulse winding, an output pulse winding, and a clock pulse winding. Information pulses are taken from at least two separate sources, are mixed, and fed to the input winding, in timed relation with the pulses received in the clock winding. This circuit now becomes a device which is capable of performing complex logical operations, rather than simply introducing a delay. The signals are compared and analyzed in the circuit, and a signal can be stored until needed, upon which it is discharged as an output signal. When discharged it contains a power gain, and it can be fed to a plurality of other magnetic elements for further analyzation. When a plurality of these circuits are combined, a computer can be made which performs all of the functions of a binary calculating system.

The means by which these objects are obtained are disclosed more fully with reference to the accompanying drawings, in which.

Figures 1, 1A:
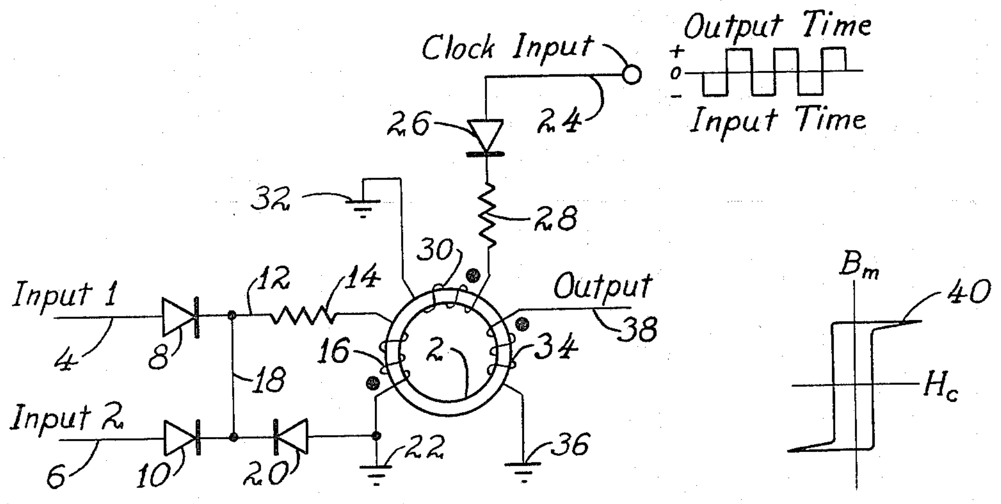
Figure 1 is a circuit diagram of one type of magnetic computing element.
Figure 1A is a diagram of the hysteresis curve for the element of Figure 1.
Figure 2:
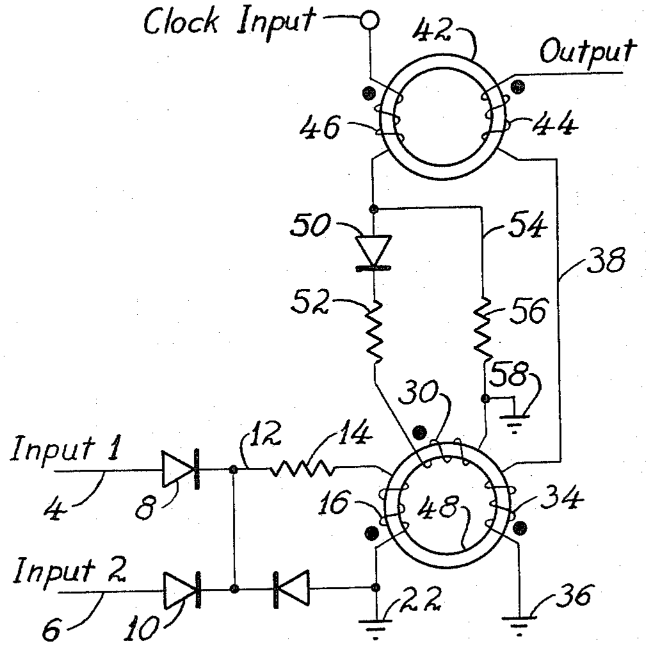
Figure 2 is a circuit diagram of a second type of magnetic computing element.
Figure 3B:
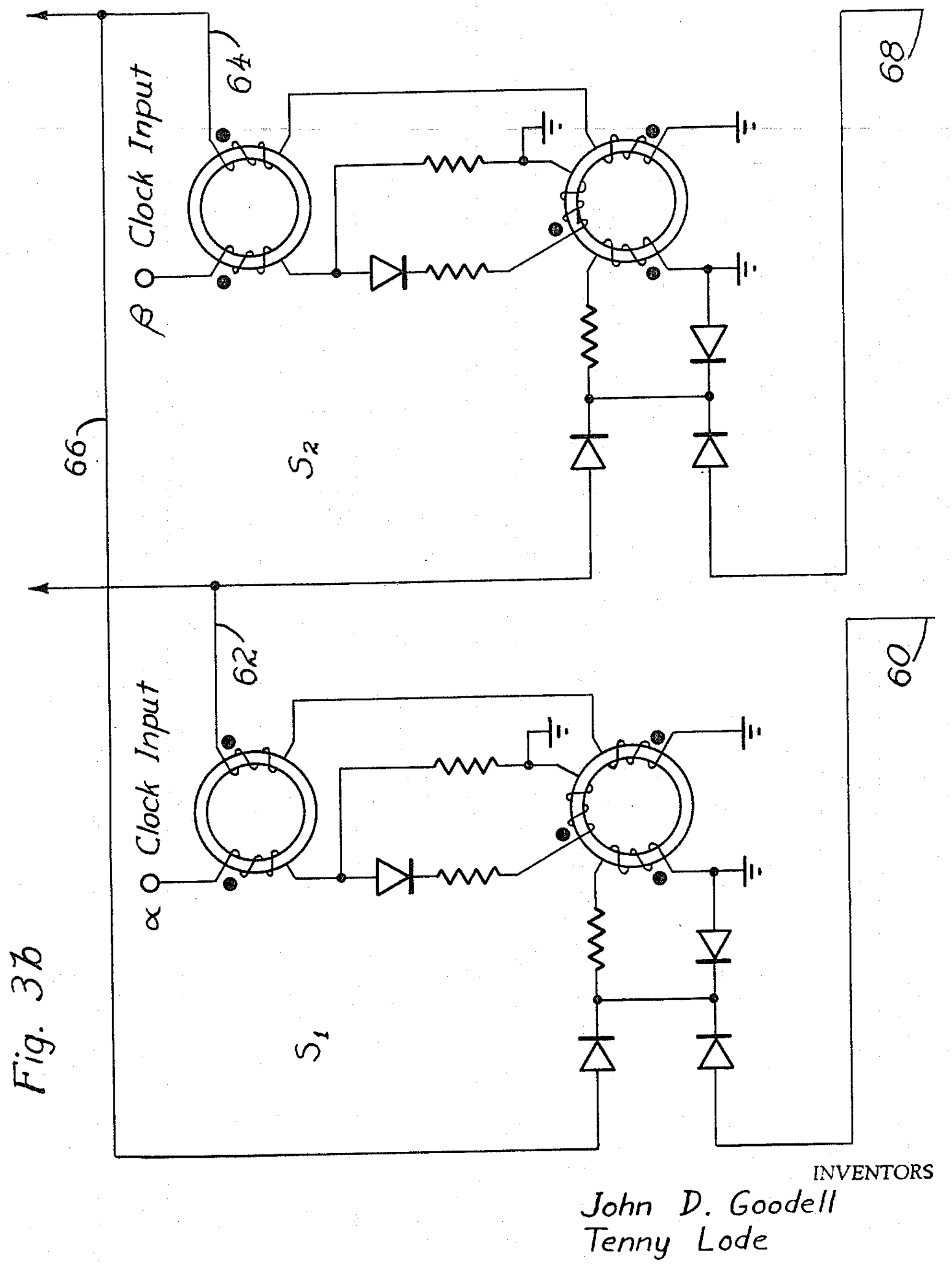
Figure 3C:
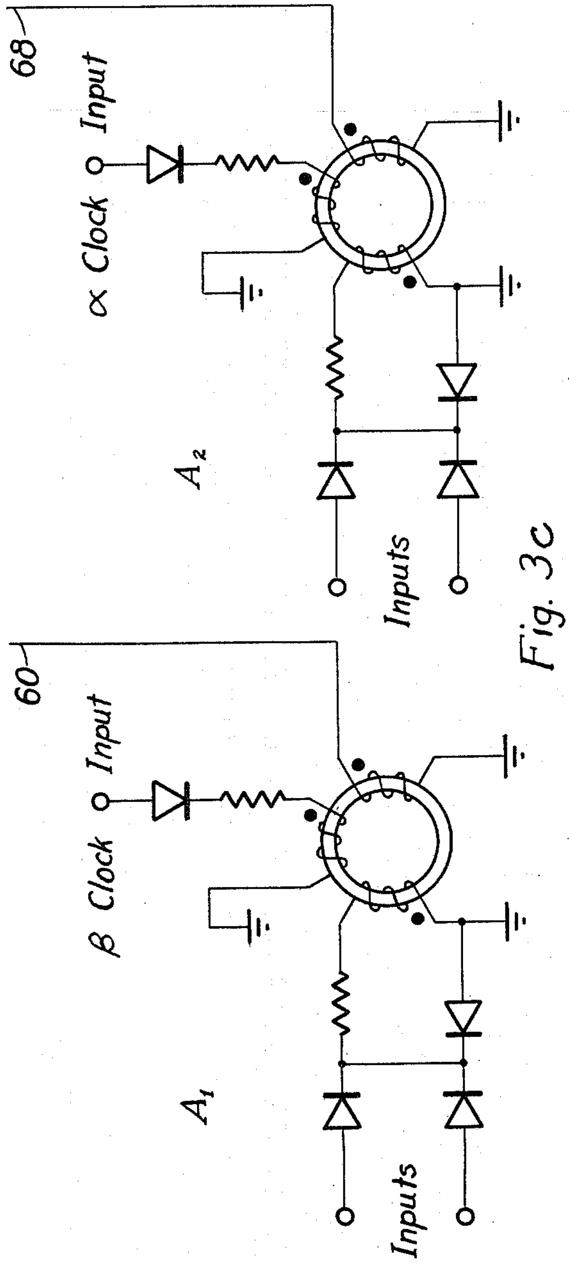
Figure 3A:
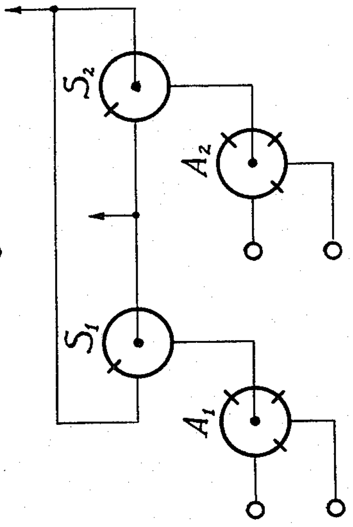
Figure 4:
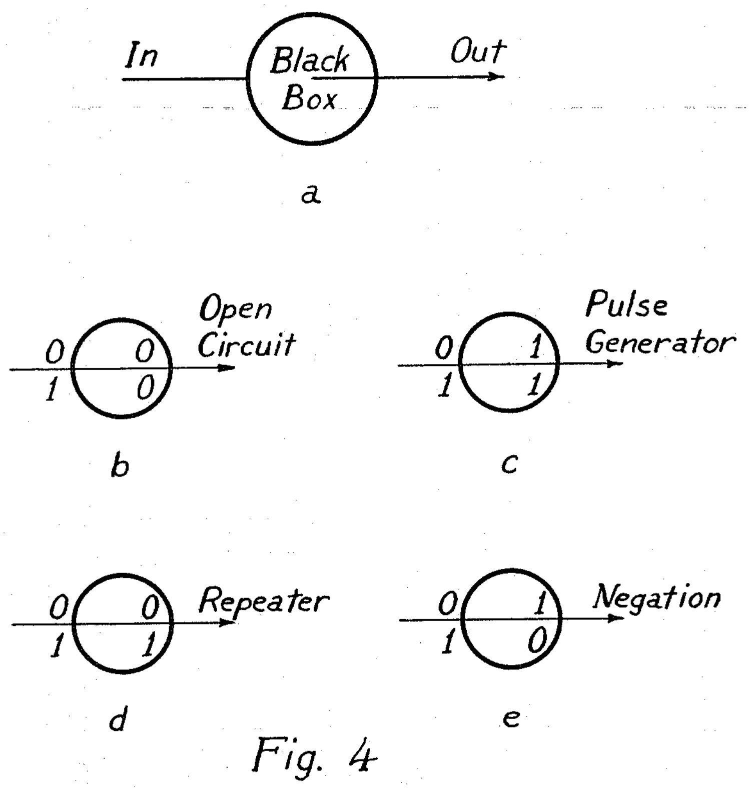

Figures 3*a*, 3*b* and 3*c* are circuit diagrams of a combination of the elements shown in Figures 1 and 2, Figure 3*a* constituting a schematic showing of an embodiment Figures 3*b* and 3*c* together constituting a detailed showing of the embodiment; and Figures 4 to 20 are diagrams symbolically illustrating the principles of a binary computing system constructed according to the present invention.

The type of magnetic computing element or member as shown in Figure 1, and designated "type A," is composed of a metallic ring 2 which has a rectangular hysteresis curve as shown in Figure 1*a* and which has properties of bistable flux remanence. This curve has a flux density axis B, and a magnetizing force axis H. Two information or input pulses are received from sources 4 and 6, which are connected to unidirectional conducting means or rectifying means such as diodes 8 and 10 respectively. From the rectifying means such as diode 8, line 12, which contains resistor 14, connects into winding 16 on ring 2. Unidirectional conducting means or rectifying means such as a diode 20 is connected in parallel with line 12 by means of line 18. Diodes 8 and 10 connected by line 18 effectively form a diode mixing circuit for mixing information received from input lines 4 and 6. The circuit is grounded at 22. A clock pulse is received in line 24 and passed through unidirectional means or rectifying means such as diode 26 and through resistance 28 and through winding 30 on ring 2, and then to ground 32. Since the winding 30 receives clock signals which control the production of output signals, it may be considered as an actuating winding. Output winding 34 is grounded at 36, and has an output lead 38. The windings 16, 30 and 34 may be considered as being magnetically coupled to the core 10 as well as being disposed on the core since any relationship for producing flux in the cores and for inducing voltages in the windings is satisfactory.

An actual magnetic computing element according to Figure 1 is constructed, for example, as follows:

Diodes 8, 10, 20 and 26 are type 1N69. Input signals of approximately 5 micro-seconds duration with an amplitude of about 10 volts are applied across the circuit from inputs 4 and 6 to ground 22. Resistance 14 is about 500 ohms. Winding 16 has 75 turns, winding 30 has 150 turns, and winding 34 has 150 turns of No. 39 wire. Core 2 consists of 30 wraps of "479 Moly Permalloy," 1/8 mil by 1/8 inch, wound on a ceramic bobbin of 3/16 inch nominal diameter. Clock voltage is 70 volts peak to peak with a trapezoidal wave form. Resistor 28 is about 500 ohms.

In the use of this element, the convention is used that maximum flux remanence in one direction corresponds to storage of 0, and maximum flux remanence in the opposite direction to storage of 1. If the initial state of the core is at remanence 0 and a pulse is applied to one or both of the input terminals 4 and 6 with the winding so poled that the input impulse drives the core to remanence 1, and the pulse is of adequate size, the core will reach saturation in the sense of 1. After the pulse is over, the core will remain at remanence 1. This operation stores the information contained in the pulse by a corresponding change in the state of the magnetic material in ring 2. For this storage to be of use, means must be provided for reading out the stored information. The provision of an output signal requires the addition of several components, certain of which are used to perform the read out function, and others to counteract undesirable secondary effects. First of all, the proper polarity of half cycle clock pulses are introduced into winding 30. Each pulse is trapezoidal and when applied, will drive the core consistently to 0 saturation. Consequently, if the core has previously been driven by a pulse in the sense 1 in winding 16, a pulse in 0 sense in winding 30 will cause a flux swing in ring 2 of almost twice the saturation density. This induces a large pulse in output winding 34. If, however, the core 2 was previously at a 0 saturation, a very small flux swing will occur and thus an output pulse so small as to be negligible will be produced.

The clock pulses appear repetitively in trains of alternating positive and negative pulses provided in two phases of push-pull, such that a positive clock pulse in the sense 0 on one line is always accompanied by a negative clock pulse in the sense 1 on a second line. In this way, intermittently operable or cyclic signals are introduced to the line 24. In a string of cascaded elements alternate units are driven by alternate clock lines. Thus, for a pair of successive elements in a chain, the driving element is on one clock line and the driven element on the other. The negative pulse on the clock line appears at input time and the positive at output time.

During output time, about half the positive clock pulse appears across clock winding 30, and half across the series resistor 28 until saturation is reached in core 2. After saturation is reached, substantially all the clock pulse voltage appears across the series resistor. The output winding 34 will have a voltage similar to that of the clock winding adjusted by the turns ratio between the clock winding 30 and output winding 34. Input winding 16 will have a similar negative voltage introduced. This negative voltage creates a problem because it is in such a direction as to permit the propagation of a disturbance into the core of the preceding element of a string of elements. This backward transmittance is prevented by means of resistor 14 and the shunt diode 20. The diode shorts out the negative pulse, and the resistor prevents excess loading of the winding by the diode.

During input time, the negative clock pulse is isolated from the clock winding 30 by diode 26. If an input pulse appears at one or both of the input terminals, 4 and 6, respectively, it is transferred to the input winding 16, negligibly attenuated by the series diode 8 or 10 and resistor 14, and it drives the core to negative saturation. The core may move up to twice as fast during input as it does during output before any loading will occur from the clock winding 30 because of the bias provided on the diode 26 by the negative clock pulse. No significant loading occurs across the output winding 34 because it is connected to the input diode of a following element which conducts only for the positive pulse. A voltage step-up ratio is necessary before the input pulse and output pulse can compensate for the diode and resistive losses. Thus, some overdrive is provided.

In Figure 2 is shown the type of element designated as "type S." This type S element is the negative of element type A, and is a device that will produce output pulses unless there has been an input signal on either or both of the input lines. It operates on the principle of cancellation.

Two magnetic cores or members are used, each of which has the same characteristics as the magnetic core 2 of Figure 1. Upper core 42 is provided with an output winding 44 and a clock winding 46, both windings being magnetically coupled to the core or disposed on the core. The clock winding 46 is connected to be affected by both the positive and negative clock input pulses. Thus the core 42 is always driven to negative saturation during input time, and always provides a positive output pulse across output winding 44 during output time. The lower core 48 is similar to the type A element in Figure 1 with the exception that the clock pulse winding 30 is connected to winding 46 of core 42 with unidirectional means as a diode 50 and resistance 52 in the line. A shunt or bypass line 54 having a resistance 56 connects to the other end of winding 30, and is grounded at 58. Furthermore, the output winding lead 38 connects to the output winding 44 on core 42. The polarity of the output winding 44 is reversed with respect to the winding 34. This is shown by the solid dots which, in the various drawings, represent positive pole position. The output pulse from winding 34 subtracts from the output pulse of winding 44 so that the effective output pulse is cancelled if an input pulse has been received. Consequently, the core 42 produces a constant stream of 1's across the output winding 44 by virtue of the repetitive flux change from 0 to 1 and back to 0 effected by the two polarities of applied clock pulses. If no input signal is received by the core 48 through inputs 4 to 6, then there is a continual output 0 across the winding 34. The net result is the algebraic sum of the voltages across windings 44 and 34 which under the stated conditions is representative of "1." If an input "1" has been received at either or both of the inputs 4 or 6, then the output voltage across the winding 34 will be in a sense and in an amplitude to subtract from the output voltage across the winding 44 producing a net result 0. Windings 44 and 46 both have 150 turns. Resistances 52 and 56 are 500 ohms and 3000 ohms, respectively.

Magnetic computing elements, types A and S, can be combined into a string of elements as shown in Figures 3*a*, 3*b* and 3*c*. Figure 3*a* is a simplified version of the embodiment shown in detail in Figures 3*b* and 3*c*, a portion of the embodiment being shown in detail in Figure 3*b* and the remaining portion of the embodiment being shown in detail in Figure 3*c*. Element A1 is the same as shown in Figure 1, and the output winding 60 is connected to one of the inputs of the element S1, which is the same, as shown in Figure 2. In turn, the output lead 62 from element S1 is connected into an input of element S2. The output from element S2 is conducted through lines 64 and 66, back into element S1 as a second information source for that element. The line 68 connects the output of element A2 into element S2 as a second information source. Thus, the two S elements are connected in a recirculating loop, with the output of one connected with the input of the other, and vice versa. This forms a circuit that has the characteristics described in the usual language of computing devices as a "flip-flop." Thus the signals at a given point in the recirculating loop will be either a stream of 1's or a stream of 0's, and may be changed from one to the other, the flip-flop being turned over upon application of a pulse to the other input of the appropriate S element. The signal to turn over the flip-flop is supplied in each instance from an A element. The symbolic form of the circuit is shown in Figure 3*a*.

It is noted that an impulse for either of the two input lines shown for an A element will turn over the flip-flop to its other state of operation since the flip-flop is operating as a bistable member. If it is sitting in such a manner that S2 is generating a stream of 1's and S1 is thus being held in a condition of generating a stream of 0's, the pulse applied to the input of S2 from A2 will cause it to generate a 0. Thus, at the next input time for S1, there will be a 0 on both input lines, causing it to generate a 1. This 1 will be applied to S2 and so on, maintaining the condition established. To reverse the flip-flop, it is only necessary to apply a pulse to S1 via A1. It is noted in Figures 3*b* and 3*c* that two inputs for each of the elements is shown. An alternate input for each element may be added. This added input is rarely used. In some instances from 3 to 5 inputs are desirable. As for the A element, this simply means that for an input on one or any combination of inputs, there will be an output 1. For the S elements, there will be an output 1 unless there is a 1 on one or more of its inputs.

For reasons of diode limitations, the maximum number of inputs with existing componentry is around 5 or 6, but there is no theoretical limit.

In Figures 4 to 20, the principles involved in creating and using the S and A circuits are symbolically illustrated. This disclosure is also found in part in The Journal of Computing Systems, vol. 1, No. 1, June 1952, Goodell, page 1, Lode, page 14; No. 2, January 1953, Goodell, page 86; and No. 31, July 1953, Martin, page 150, and Goodell, page 196; published by the Institute of Applied Logic, St. Paul, Minnesota.

In binary coded form, all information is represented by patterns of 1 and 0, and these are the only values that may be assigned to the variables. If such patterns appear serially, i.e., one digit at a time, at the input of a device that has one input and one output, see Figure 4*a*, then this black box may perform one of four different possible types of operation. In Figure 4*b*, if 0's always appear at the output, then this is an open circuit. If in Figure 4*c*, 1's appear continually, regardless of the input signal, the device is a signal pulse generator. If, in Figure 4*d*, a 0 at the input produces a 0 at the output, and a 1 produces a 1, this is a repeater. These three possible devices are not particularly important except to establish the completeness of the system. The fourth possible operation, Figure 4*e*, is called negation. A 1 at the input produces a 0 at the output, and a 0 in produces a 1 out. This negation is the key to all complete digital computing systems.

If information can be combined from at least two sources, and if negation can be performed, then anything can be done that is possible to do in contemporary digital computing machines. This is not simply an interesting philosophical idea. It is literally true that this logical structure proves that it is possible and practical to use a single basic building block for the design and the production of any digital computer.

Figure 5:
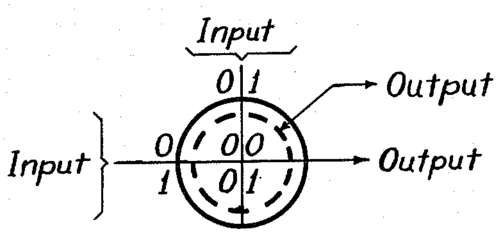

It is also possible to build performance tables that show the characteristics of black boxes with two inputs and one output. In a performance table of this kind, as shown in Figure 5, the possible outputs for various input conditions are shown in the circle. The particular table drawn above for illustration describes what is commonly called a coincidence circuit. It says that for 0 at both inputs the output is 0, and for a 1 and a 0 in either combination the output is also 0. The only condition that produces an output 1 is where there is an input coincidence of 1 and 1.

Figure 6:
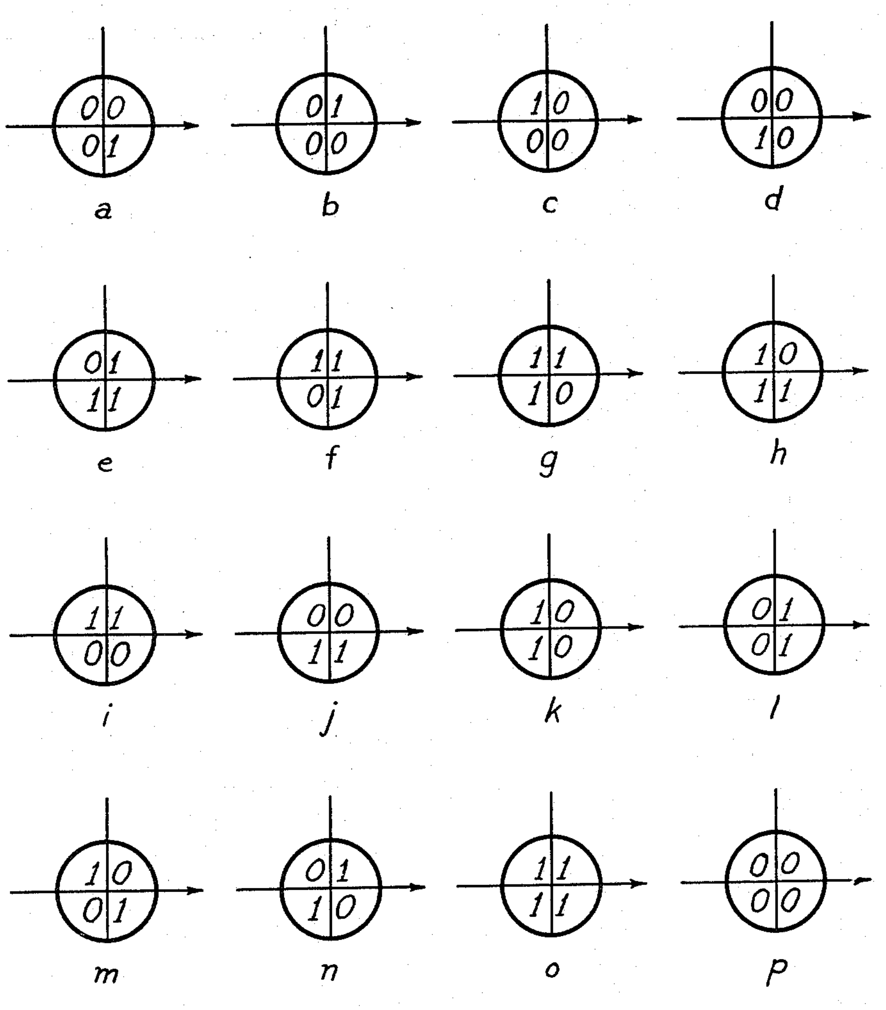
Figure 7:
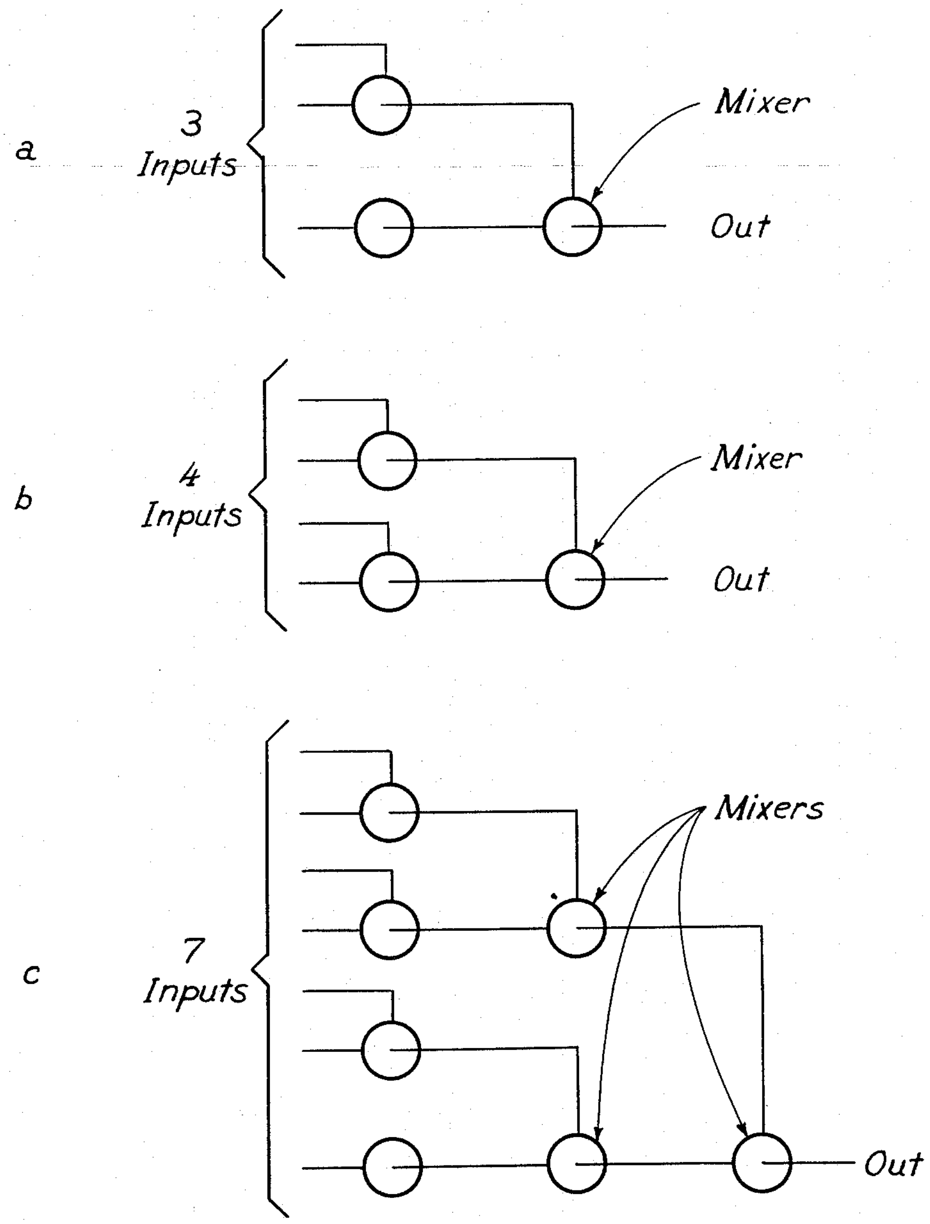
Figure 8:
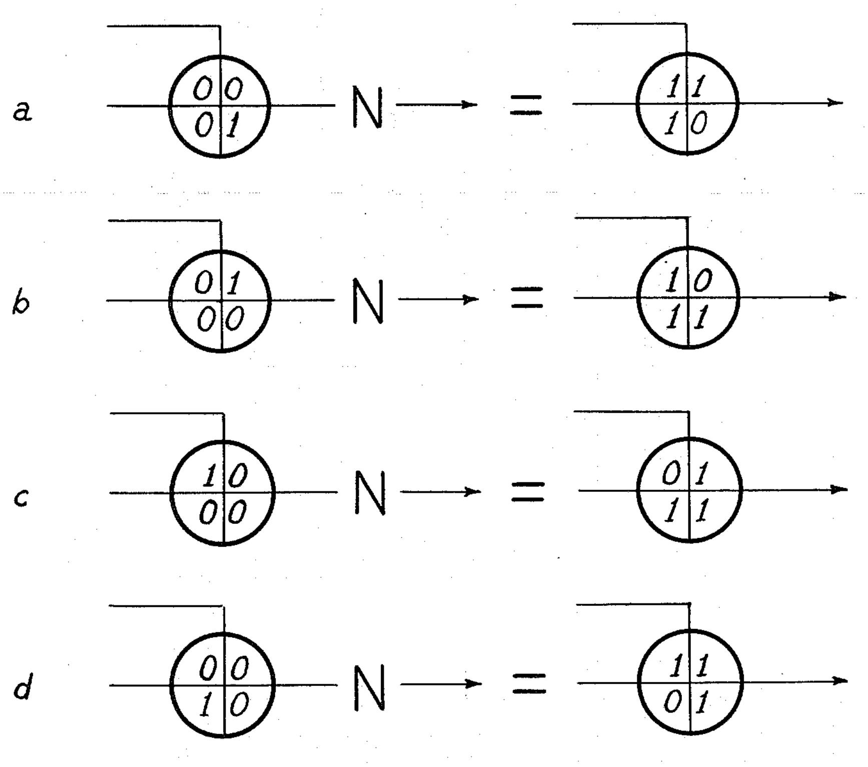

We noted that only four operations could be performed with a single input device. For devices with two inputs there are sixteen possible combinations, as shown in Figures 6, *a* to *p*.

In order to build devices with a large number of inputs, it is only necessary to combine the single and dual input elements and mix their outputs. The diagrams in Figure 7, *a*, *b* and *c*, show the arrangement for three, four and seven inputs, respectively. Clearly, this process may be extended to include infinite numbers of inputs in any possible combination. Thus, the four single-input and sixteen dual-input devices describe completely the building blocks necessary to construct a complete system.

But twenty different kinds of basic structures are too many; it complicates the inventory unnecessarily. Some of these devices may be synthesized from others, and the key to this is negation. Consider first the four devices with a single mark in the output in Figure 8. If we negate the output in each quadrant as in Figure 8, *a* to *d*, it means that a 0 will change to a 1, and a 1 will be changed to 0. Thus, the combination of a single-mark element and negation in its output is equivalent in performance to a three-mark element. This is one way to synthesize elements by means of negation.

The possibility of combining outputs using a mixing circuit has been discussed. By connecting the inputs of certain elements in parallel and mixing their outputs we have another method of synthesis.

Figure 9:
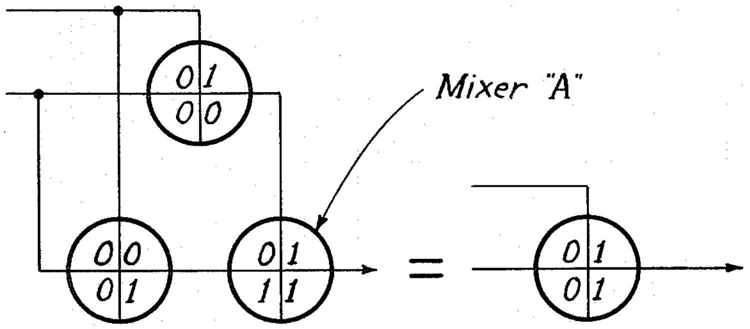
Figure 10:
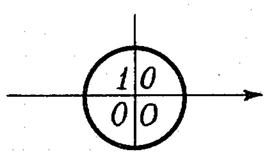

As shown in Figure 9, the combining of two single-mark elements with parallel inputs and using an output mixer, forms the equivalent of a two-mark element. Fortunately, one of the elements with two inputs has the properties of a mixer. Symbolically, this is element A1. Note that for 0 on both inputs it produces an output 0, but for a 1 on either or both inputs it produces an output 1. Thus, it can be used as a mixer.

A simplified notation is now introduced in the following paragraphs for describing these devices, and it is then demonstrated that all of the elements can be synthesized using only one basic device which we term "S," which symbolically is the element S of Figure 2. Starting with the basic diagram of Figure 10, the form of Figure 11 is constructed.

Figure 11:
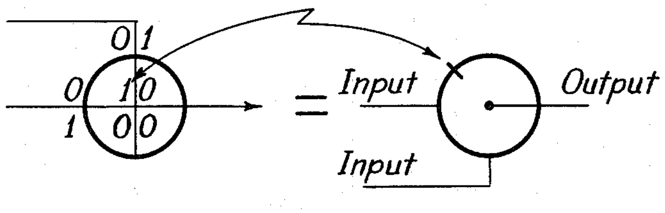

This notation in Figure 11 is very simple and also very useful for the design and analysis of block diagrams. It has the advantage of completely describing the performance of the various elements of the system, and also can be directly translated into a wiring diagram for programming.

Figure 12:
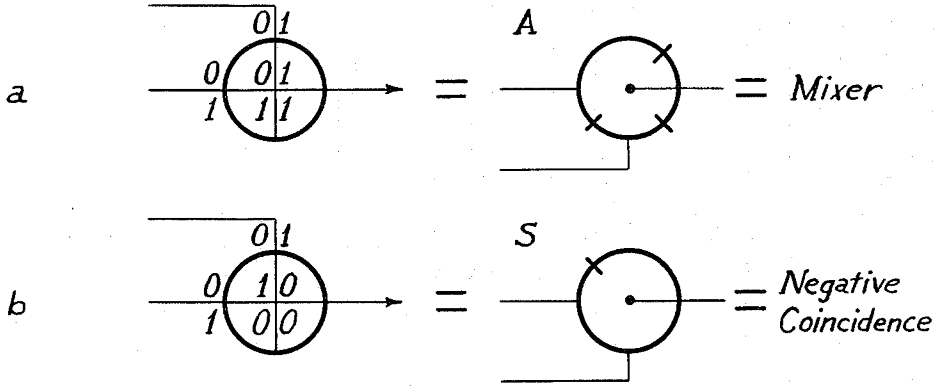
Figure 13:
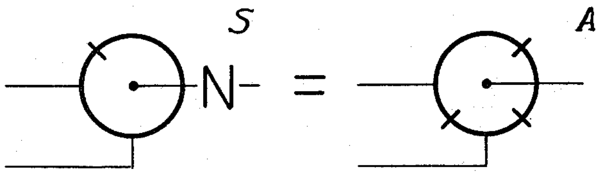

As shown in Figure 11, the output is drawn as a line originating from the center of the circle, and the inputs may terminate at any point on the periphery. The possible values for the inputs are only 0 and 1, so that this convention may be accepted for all elements. For every 1 that appears in the output table, or matrix, we place a "slash-mark" in circumference of the corresponding quadrant of the circle. Thus, the diagrams in Figure 12 are equivalent.

The letter N indicates negation. The system of converting a single-mark element to a three-mark element by means of output negation has been described above and is illustrated in Figure 13. An "S" with a negated output is equivalent to the mixer "A."

Figure 14:
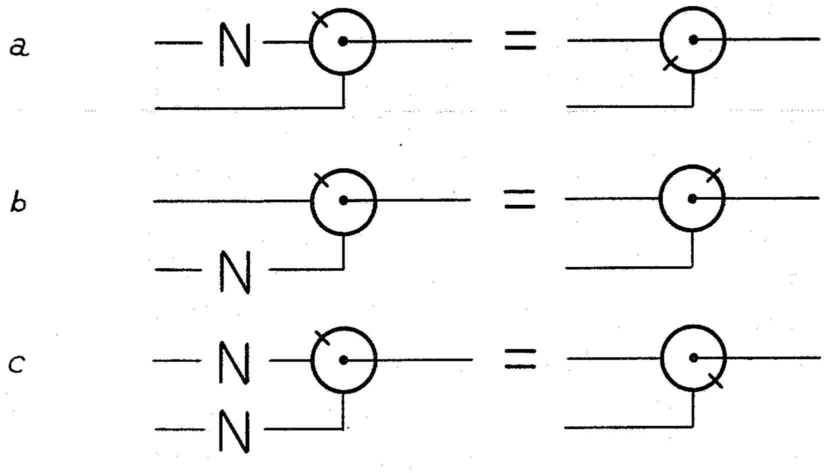
Figure 17:
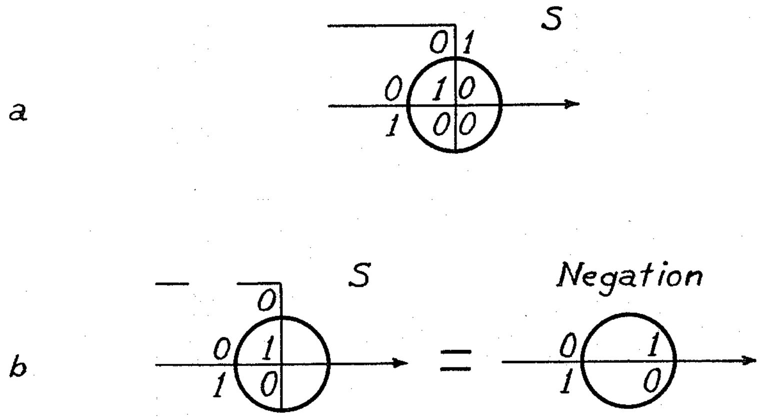

The effect of negation inserted in the input circuits is evident from a comparison of Figures 14, *a*, *b* and *c*.

If negation is introduced in one input, the result is to generate a synthetic element with each mark reflected across the corresponding axis. In Figure 14*a*, negation in the horizontal input effectively rotates the mark 90° in one direction. In Figure 14*b*, negation in the other input line rotates the mark 90° in the other direction. Negating both inputs as shown in Figure 14*c* reflects the marks across both axes; it effectively rotates all marks 180°.

Figure 15:
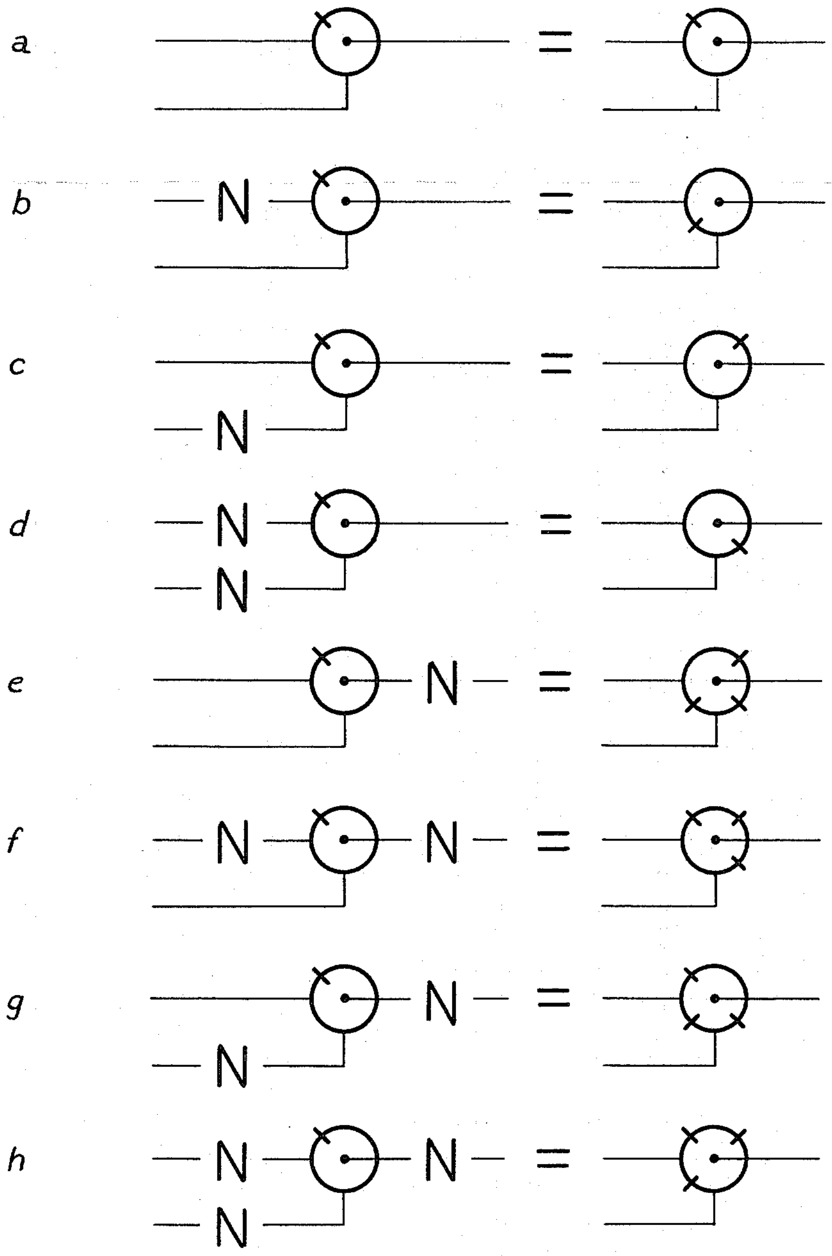

These three examples show that if "S" and negation are had, the other three elements that have single marks can be produced. Earlier it was described how the three-mark elements can be produced from the single-mark elements using output negation. Figure 15 shows how eight of the sixteen elements are built using only "S" and negation. Note that Figure 15*e* is the mixer "A," and it may be built for "S" with a negated output.

Figure 16:
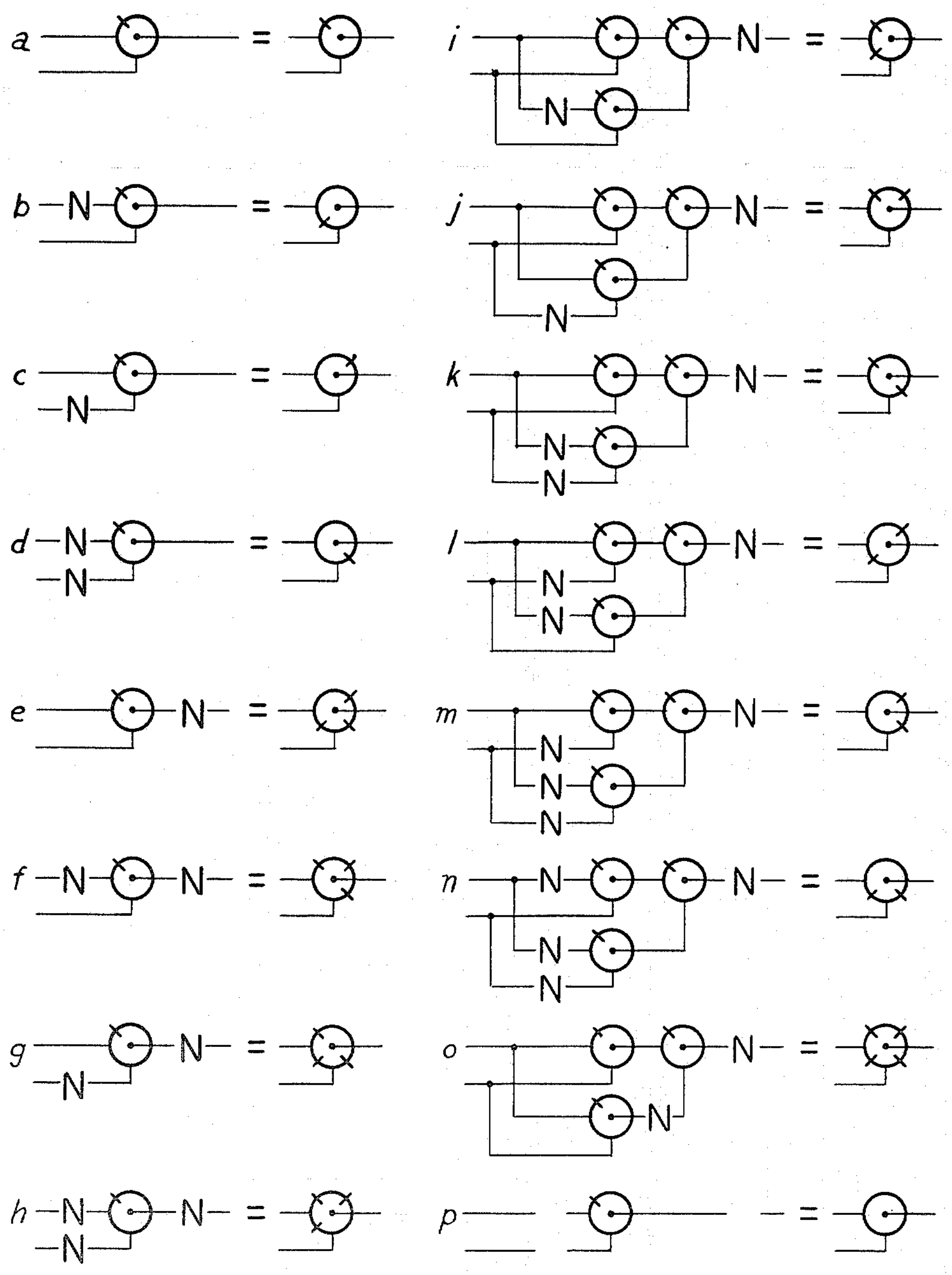

The building of all the elements having two marks from elements having one mark by means of connecting their inputs in parallel and mixing the outputs has been discussed. It is evident that this can be accomplished by also using only "S" and "N." We have the mixer "A," and we can convert "S" into any single-mark element using suitable input negations. In Figure 16, *a* to *n* inclusive, is shown that we can synthesize fourteen of the sixteen possible dual-input devices using only "S" and "N." Only two others need be defined to complete the system.

In Figure 160 it is shown that by combining "S" and "A," synthesized from "S" and "N," in parallel we have the four-mark element. To obtain the element with no marks we disconnect everything as in Figure 16*p*. A complete system is built.

Now, if we could obtain negation from "S," only one type of device would be required in our complete inventory of elements for building the program, control, arithmetic, and memory sections of any digital computing system.

The performance table for "S" is shown in Figure 17*a*. Consider the effect of open-circuiting one input in Figure 17*b*. The open input always represents 0, and the result is equivalent to negation for one input.

Figure 18:
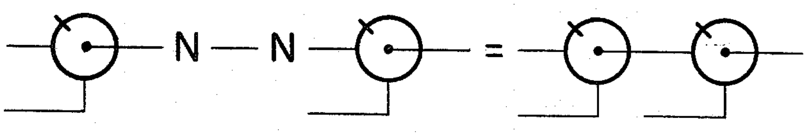

Upon first examination it might appear that a system using only "S" would require an excessive number of elements used as negation. However, when a complete system is designed there are many cases in which two negations appear in series. This, of course, is redundant, and both of them may be eliminated without changing the character of the system as shown in Figure 18.

Figure 19:
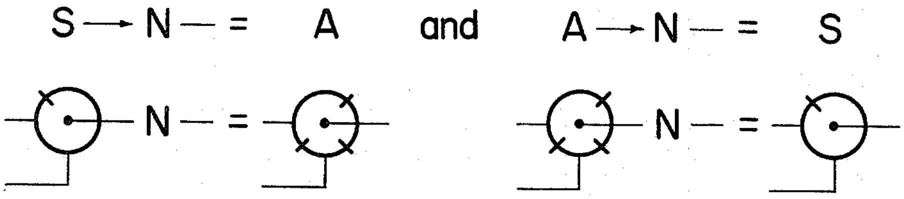
Figure 20:
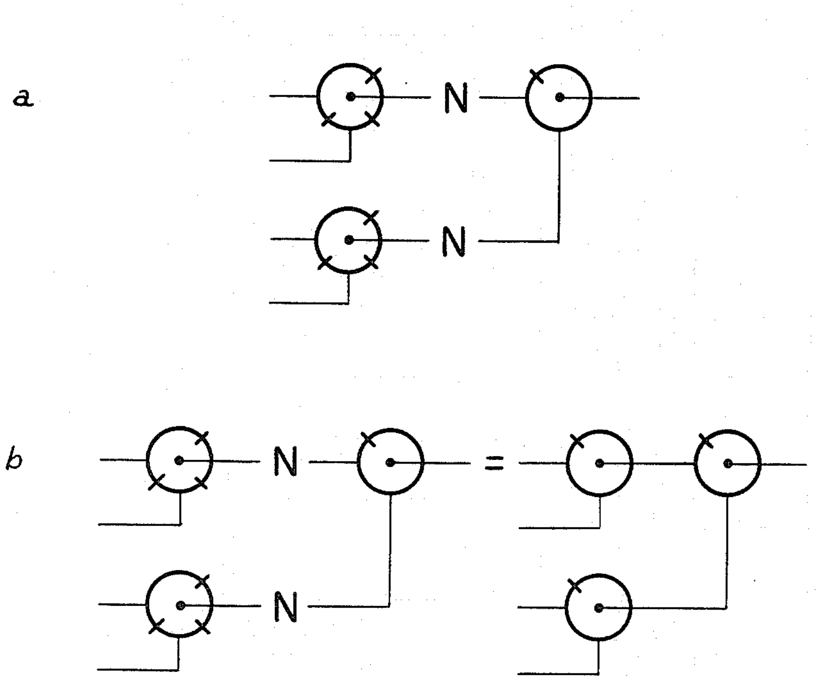

Another way to eliminate negations is to have the element "A" available in addition to "S." These elements are related by output negation as shown in Figure 19. Thus, for example, if a circuit design called for coincidence driven from two mixers, we would first think of building it by using "S" for the coincidence circuit with negation in both inputs as shown in Figure 20*a*. The negations serve to rotate the marks in the "S" element 180°. But we have said that our element "A" with a negated output is equivalent to "S," and a direct substitution can be made as indicated in Figure 20*b*. Thus, a device that appears to require two extra elements for negation needs none. In this initial approach to programming, the desired system may be built up using any of the elements that are conveniently adapted to the thinking of the designer, and subsequent conversions to "S" and "A" may be made with many of the negations eliminated.

It should be appreciated that the various windings such as the windings 16, 30 and 34 in Figure 1 do not necessarily have to be formed by a plurality of turns looped around the core 2. It would be sufficient if the windings were disposed in magnetic proximity to the core or if the windings were magnetically coupled to the core in any manner. These relationships would be sufficient provided that flux would be produced in the core upon the passage of current through the windings and provided that voltages would be induced in the windings upon changes of flux in the core. It should be further appreciated that any magnetic member can be used as the core 2. Preferably the magnetic member has a toroidal shape but it can have any other suitable shape as well.

It will be understood that any uni-directional means can be substituted for the various diodes such as the diodes 8, 10, 20 and 26 in Figure 1. Furthermore, the clock input does not necessarily have to produce signals at regular intervals but can also operate on an intermittent basis. The clock input can operate on an intermittent basis as long as there is a synchronization between the signals from the clock input and the signals introduced to the input lines, such as the lines 4 and 6 in Figure 1.

Having now described the means by which the objects of the invention have been attained:

We claim:

1. A magnetic pulse controlling element comprising first and second members magnetizable alternately to two different directions of magnetization and having properties of bistable flux remanence, alternate clock pulse source means, winding means connected to each of said members in series and connected to said pulse source means, the winding means on the first member being excitable by said pulse source means to alternately change the direction of magnetization in the first member, first rectifying means in said winding means to block pulses introduced to the winding means on said first member in one direction of magnetization from reaching the winding means on said second member, input pulse means for the second member including second rectifying means for obtaining an introduction of pulses of only a particular polarity to the second member, and output winding means connected in series to each member and operable upon the occurrence of an input pulse in said second member to nullify an output pulse in said first member.

2. A magnetic computing element for a binary computing machine comprising a first magnetic core having a substantially rectangular hysteresis curve and having properties of bistable flux remanence, means for combining intelligence information electrical pulses from at least two sources and for magnetically storing the combined resultant in said core in a constant direction of magnetization, means for alternately magnetizing said core in a direction of magnetization opposite to said constant direction with timed pulses, means electrically connected to said core for driving an output pulse from said core as a function of the state of magnetization of the core coincidentally with the application of the timed pulse, said combining and storing means further comprising input lead lines adapted to be connected to at least two separate information sources, an input winding on said core, a diode and a resistance connected in parallel and further connecting said lead lines to said winding, a diode in each of said lead lines, said alternately magnetizing means further comprising a clock winding on said core, a second core having a substantially rectangular hysteresis curve and having properties of bistable flux remanence, means for producing a clock pulse in said second core, means including a diode and resistance connected in parallel for connecting said clock pulse means to said first mentioned core, output means for each core, respectively, and means connecting said output means in series.

3. In combination, a member saturable with magnetic flux of first and second polarities and having properties of retaining a substantial amount of magnetic flux upon the interruption of any driving force for producing the flux, a plurality of windings to the magnetic member, means for providing alternating clock signals, means associated with a first winding in the plurality of providing for the introduction of input signals to the winding to produce magnetic fluxes of the second polarity during the production of the portions of the clock signals having a first polarity, and means for providing for the introduction of the alternating clock signals to a second winding in the plurality to produce a change of flux in the member from the second polarity to the first polarity during the production of the portions of the clock signals having a second polarity and to prevent the passage of any clock signal to the winding upon the production of flux in the member by the introduction of the input signals, a third winding in the plurality of being connected to produce output signals upon a change of flux in the member during the introduction to the second winding of the portions of the clock signals having the second polarity.

4. In combination, a member saturable with magnetic fluxes of first and second polarities and having properties of retaining a substantial amount of magnetic flux after the interruption of any current flow, means for providing intermittent signals having first and second polarities, a first winding on the magnetic member and first unidirectional conducting means connected in electrical circuitry with the intermittent signal means for introducing the intermittent signals to the first winding to produce magnetic flux of the first polarity in the member during the portions of the intermittent signals having the first polarity and for preventing the flow of current through the circuitry during the portions of the intermittent signals having the second polarity, means for providing input signals at substantially the same time as the production of the portions of the intermittent signals having the second polarity, a second winding on the magnetic member and second unidirectional conducting means connected in electrical circuitry with the input signal means for introducing the input signals to the second winding in a direction for producing magnetic flux of the second polarity in the magnetic member, and a third winding on the magnetic member for producing an output signal upon a change of flux in the magnetic member from the second polarity to the first polarity.

5. In combination, a member saturable with magnetic fluxes of first and second polarities and having properties of bistable flux remanence, a plurality of windings magnetically coupled to the core to produce flux in the member upon the flow of current through the windings and to have voltages induced in them upon the production of flux in the magnetic member, means associated with a first winding in the plurality for introducing alternating clock signals to the winding to produce flux of the first polarity during the introduction of first portions of the clock signals having a first polarity, first unidirectional conducting means connected in a circuit with the last mentioned means and the first winding to prevent the flow of current through the winding during the introduction of second portions of the clock signals having a second polarity, means associated with a second winding in the plurality for introducing input signals to the winding to produce flux of the second polarity in the magnetic member during the introduction of the second portions of the clock signals, and second unidirectional conducting means connected in a circuit with the last mentioned means and the second winding to prevent the feedback of a signal to the last mentioned means upon changes of flux in the magnetic member during the introduction of the first portions of the clock signals, a third winding in the plurality being provided to produce output signals upon changes of flux in the magnetic member from the second polarity to the first polarity.

6. In combination, a member saturable with magnetic fluxes of first and second polarities and having properties of retaining a substantial amount of magnetic flux upon the interruption of any driving force for producing the flux, a plurality of windings magnetically coupled to the magnetic member, means for providing cyclic signals and for introducing the cyclic signals to a first winding in the plurality to produce magnetic flux of the first polarity during a first portion of each cyclic signal, means including first unidirectional conducting means connected in a circuit with the last mentioned means and the first winding to prevent the passage of current through the circuit during a second portion of each cyclic signal, means for providing input signals and for introducing the input signals to a second in the plurality winding during the introduction of the second portions of the cyclic signals to the first winding to produce changes of flux in the magnetic member from the first polarity to the second polarity, conducting means including second unidirectional means connected in a circuit with the last mentioned means and the second winding for providing for the introduction to the winding of signals having only a polarity and in a direction for producing flux of the second polarity in the member, and conducting means including third unidirectional means connected in the last mentioned circuit to prevent feedback in the circuit upon changes of flux in the magnetic member from the second polarity to the first polarity during the introduction of the first portions of the intermittent signals to the first winding, a third winding being provided in the plurality to produce output signals upon changes of flux in the magnetic member from the second polarity to the first polarity.

7. In combination, a member saturable with magnetic fluxes of first and second polarities and having properties of bistable flux remanence and having substantially rectangular response characteristics of flux production, means for providing intermittent signals alternately having first and second polarities, a first winding on the member, first unidirectional conducting means, a first resistance, means including the first winding, the first unidirectional conducting means and the first resistance connected in a circuit for receiving the intermittent signals and for providing for the flow of current during the intermittent signals of first polarity to produce flux of the first polarity in the member and for preventing the flow of current through the circuit during the intermittent signals of second polarity, means for providing input signals during the production of the intermittent signals of second polarity, second unidirectional conducting means, a second winding on the member, conducting means including the second unidirectional means and the second winding for introducing the input signals to the second winding to produce changes of flux in the magnetic member from the first polarity to the second polarity, third unidirectional conducting means, a second resistance, means including the third unidirectional means and the second resistance connected in a circuit with the second winding on the member and with the second unidirectional means to inhibit the introduction of feedback signals to the input means, and a third winding on the magnetic member for producing output signals upon changes of flux in the member from the second polarity to the first polarity.

8. In combination, first and second members each saturable with magnetic fluxes of first and second polarities and having properties of bistable flux remanence and having substantially rectangular response characteristics of flux production, first and second pluralities of windings respectively coupled magnetically to the magnetic members to produce fluxes in the members upon the flow of current through the windings and to have voltages induced in them upon the production of fluxes in the members, means associated with first windings in the first and second pluralities for introducing alternating clock signals to the windings for the alternate production in the second member of magnetic fluxes of the first and second polarities and for the production in the first member of magnetic fluxes of only the first polarity, and means associated with a second winding in the first plurality for introducing input signals to the winding to produce magnetic fluxes of the second polarity in the first member during the production of magnetic fluxes of the second polarity in the second member, a third winding in the first plurality and a second winding in the second plurality being connected in a circuit to produce output signals upon the formation in the second member of fluxes of the first polarity at the time of introduction of the clock signals to the first winding in the second plurality without any simultaneous formation in the first member of fluxes of the first polarity at the time of introduction of the clock signals to the first winding in the first plurality.

9. In combination, first and second members each saturable with magnetic fluxes of first and second polarities and having properties of retaining substantial amounts of magnetic fluxes upon the interruption of any driving force for producing the fluxes, a first plurality of windings magnetically coupled to the first magnetic member, a second plurality of windings magnetically coupled to the magnetic member, means for providing cyclic signals and for introducing the cyclic signals to first windings in the first and second pluralities to produce magnetic fluxes of the first polarity in the first and second members during the portion of each cyclic signal having a first polarity, means forming electrical circuitry with the last mentioned means and with the first windings in the first and second pluralities for providing for the production of magnetic fluxes of the second polarity in the second magnetic member during the portion of each cyclic signal having a second polarity and for preventing the introduction of the portion of each cyclic signal having the second polarity to the first winding magnetically to the first member, and means for providing input signals and for introducing the input signals to a second winding in the first plurality during the introduction to the first winding in the second plurality of the portions of the cyclic signals having the second polarity to produce changes of flux in the first magnetic member from the second polarity to the first polarity, a third winding in the first plurality and a second winding in the second plurality being connected in a circuit to produce output pulses upon changes of flux in the second member from the second polarity to the first polarity without corresponding changes of flux in the first member.

10. In combination, first and second members each saturable with magnetic substantial amounts of fluxes of first and second polarities and having properties for retaining fluxes in the member even after the interruption of any driving force for producing the fluxes, means for providing intermittent signals alternately having first and second polarities, electrical circuitry including first windings on the first and second magnetic members and including first unidirectional conducting means connected to the first winding on the first member for introducing the intermittent signals to the first winding on the second member to produce magnetic fluxes of the first polarity during the first signal polarities and to produce magnetic fluxes of the second polarity during the second signal polarities and for introducing the intermittent signals of only the first polarity to the first winding on the first member to produce magnetic fluxes of the first polarity during the first signal polarities and to inhibit the production of magnetic fluxes of the second polarity in the first member during the second signal polarities, means for providing input signals during the portions of the intermittent signals having the second polarity, electrical circuitry including a second winding on the first member and second including unidirectional conducting means for introducing the input signals to the second winding to produce fluxes of only the second polarity in the first member, and electrical circuitry including a third winding on the first member and a second winding on the second member for producing output signals upon changes of flux in the second member from the second polarity to the first polarity without corresponding changes of flux in the first member.

11. In combination, first and second members each saturable with magnetic fluxes of first and second polarities and having properties of bistable flux remanence and having substantially rectangular response characteristics of flux production, means for providing intermittent signals alternately having first and second polarities, electrical circuitry including first windings on the first and second magnetic members and including first unidirectional conducting means connected in a first path for introducing the intermittent signals of first polarity to the windings to produce magnetic fluxes of the first polarity in the members and for preventing the introduction of the intermittent signals of second polarity to the first winding on the first member, electrical circuitry including the first winding on the second member and including a resistance for bypassing the first unidirectional conducting means and the first winding on the first member to produce magnetic fluxes of the second polarity in the second member during the production of the intermittent signals of second polarity, means for providing input signals during the portions of the intermittent signals having the second polarity, electrical circuitry including a second winding on the first member and including second unidirectional conducting means for introducing the input signals to the second winding to produce fluxes of the second polarity in the first member, and electrical circuitry including a third winding on the first member and a second winding on the second member for preventing the production of output signals upon the simultaneous formation of fluxes of the first polarity in the first and second members at the time of introduction of the intermittent signals of first polarity to the first windings on the first and second members and for producing output signals upon the formation of fluxes of the first polarity in the second member without any simultaneous formation of fluxes of the first polarity in the first member at the time of introduction of the intermittent signals of first polarity to the first windings on the first and second members.

12. In combination, first and second members each saturable with magnetic fluxes of first and second polarities and having properties of bistable flux remanence and having substantially rectangular response characteristics of flux production, means for providing intermittent signals alternately having first and second polarities, first windings on the first and second members, first unidirectional conducting means, a first resistance, a second resistance, means including the first windings, the first unidirectional conducting means and the first resistance connected in a first circuit for introducing the intermittent signals of first polarity to the windings for the production of fluxes of the first polarity in the first and second members and for preventing the introduction of the intermittent signals of second polarity to the first winding on the second member, means including the second resistance and the first winding on the second member for by-passing the first resistance and the first winding on the first member for the introduction of the intermittent signals of second polarity to the first winding on the second member to produce fluxes of the second polarity in the second member, means for providing input signals during the production of the intermittent signals of second polarity, second unidirectional conducting means, a second winding on the first magnetic member, means including the second unidirectional conducting means and the second winding on the first member for introducing the input signals to the second winding to produce changes of flux in the second member from the first polarity to the second polarity, third unidirectional conducting means, a third resistance, means including the third unidirectional conducting means and the third resistance connected in a circuit with the second winding on the first member to inhibit the introduction of feedback signals to the input means, and a third winding on the first magnetic member and a second winding on the second magnetic member connected in a circuit for producing output signals upon changes of flux in the second magnetic member from the second polarity to the first polarity without corresponding changes of flux in the first member at substantially the same time.

13. A magnetic pulse controlling device comprising first and second saturable cores each magnetizable alternatively to two opposite states and each made from a material having substantially rectangular response characteristics of flux production, means comprising a first input winding on the first of said cores and connected to be selectively energized to change said first core from a first one of said states to the second state, two actuating windings, one on said first core and one on said second core, intermittently operable means for simultaneously energizing said two actuating windings by applying a current thereto flowing in one direction; the one of said actuating windings on said first of said cores being effective to change said core to the second state, output means comprising two output windings one on said first core and one on said second core; said output windings being connected in series; the one of said actuating windings on said second core being effective to change the magnetic state of said second core from the second state to the first state and to simultaneously induce in the output winding on said second core a current opposite and equal to any current induced in the output winding on said first core by simultaneous energization of the actuating winding on said first core, and means connected to the actuating winding on the second core for obtaining a change in the state of said second core to the second state between the intermittent applications of current to the actuating windings on the first and second cores for producing the first magnetic states in the cores.

14. Apparatus as set forth in claim 10, including, third and fourth members corresponding to the first and second members, first, second and third windings on the third member corresponding to the first, second and third windings on the first member, first and second windings on the fourth member corresponding to the first and second windings on the second member, electrical circuitry associated with the windings on the third and fourth members in a manner similar to that recited for the corresponding windings on the first and second members, means providing a coupling between the second winding on the fourth member and the second winding on the first member and between the second winding on the second member and the second winding on the third member to obtain a signal output from either the first and second members or from the second and third members at any one time and in which a fifth member is saturable with magnetic fluxes of first and second polarities and is provided with properties of retaining substantial amounts of fluxes in the member even after the interruption of any driving force for producing the flux and in which a fifth plurality of windings is disposed on the member and in which a first winding in the fifth plurality is connected in an electrical circuit to receive only the intermittent signals of first polarity for the production of flux of the first polarity in the fifth member and to prevent the introduction of the intermittent signals of second polarity to the first windings in the fifth plurality and in which a second winding in the fifth plurality is connected to receive input signals during the intermittent signals of second polarity for the production of flux of the second polarity in the core and in which a third winding in the fifth plurality is connected in an electrical circuit with the second winding on the first member to introduce pulses to the latter winding upon the production of fluxes of the first polarity in the fifth member and in which a sixth member is provided corresponding to the fifth member and in which a sixth plurality of windings is disposed on the member and in which the windings in the sixth plurality are connected in electrical circuits corresponding to the windings in the fifth plurality and in which a particular winding in the sixth plurality corresponding to the third winding in the fifth plurality is connected in an electrical circuit with a particular winding in the third plurality corresponding to the second winding in the first plurality to introduce pulses to the particular winding in the third plurality upon the production of pulses of the first polarity in the sixth member and in which the intermittent signal means is connected to introduce signals to the first windings on the first, second and fifth members at the same time as introducing signals of the second polarity to the first windings on the third, fourth and sixth members and vice versa.

15. Apparatus as set forth in claim 11, including, third and fourth members respectively corresponding to the first and second members, first, second and third windings on the third member corresponding to the first, second and third windings on the first member, first and second windings on the fourth member corresponding to the first and second windings on the second member, conducting means including unidirectional means and input means associated with the different windings on the third and fourth members in a manner similar to that recited for corresponding means and the windings on the first and second members, the intermittent signal means being associated with the windings on the third and fourth members to provide signals of the first polarity to the windings on the third and fourth members at the same time as signals of the second polarity to the windings on the first and second members and vice versa, means providing an interrelationship between the second windings on the first and fourth members and between the second windings on the second and third members, a fifth member saturable with fluxes of the first and second polarities and having properties of flux remanence and having substantially rectangular response characteristics of flux production, first, second and third windings on the fifth member, means including third unidirectional conducting means connected in electrical circuitry with the first winding on the fifth member for providing for the introduction of the intermittent signals of first polarity to the winding for the production of flux of the first polarity in the member and for preventing the introduction of the intermittent signals of the second polarity to the winding, means including the second winding on the fifth member and including fourth unidirectional means connected in electrical circuitry for providing for the introduction of signals of the second polarity during the introduction of the intermittent signals of second polarity to the last mentioned means to produce flux of the second polarity in the member, the third winding on the fifth member being connected in an electrical circuit with the second winding on the first member to introduce signals to the latter winding, a sixth member corresponding to the fifth member, first, second and third windings on the sixth member corresponding to the first, second and third windings on the fifth member, the first and second windings on the sixth member being connected in electrical circuits corresponding to the electrical circuits for the first and second windings on the fifth member, the third winding on the sixth member being connected in an electrical circuit with the second winding on the third member to introduce signals to the latter winding, the intermittent signal means being coupled electrically to the first windings on the fifth and sixth members to introduce signals of the first polarity to the first winding on the fifth member and at the same time to introduce signals of the second polarity to the first winding on the sixth member and vice versa.

16. Apparatus as set forth in claim 8 in which third and fourth members correspond respectively to the first and second members and in which third and fourth pluralities of windings are respectively coupled magnetically to the third and fourth members and in which clock signal means and input signal means are electrically coupled to the windings in the third and fourth pluralities in a manner similar to that recited for the windings in the first and second pluralities and in which the second winding in the second plurality is coupled to the winding in the third plurality corresponding to the second winding in the first plurality and in which the winding in the fourth plurality corresponding to the second winding in the second winding in the second plurality is electrically coupled to the second winding in the first plurality and in which a fifth magnetic member is saturable with magnetic fluxes of first and second polarities and is provided with properties of bistable flux remanence and with substantially rectangular response characteristics of flux production and in which a fifth plurality of windings is magnetically coupled to the fifth magnetic member and in which a first winding in the fifth plurality is connected in an electrical circuit to receive clock signals of alternate polarities and to produce fluxes of the first polarity in the fifth magnetic clock signals upon the introduction of a first polarity and to prevent the introduction of the clock signals of second polarity to the winding and in which a second winding in the fifth plurality is connected to receive an input signal during the clock signals of the second polarity for the production of flux of the second polarity in the fifth member and in which signals induced in a third winding in the fifth plurality are introduced to the second winding of the first plurality to produce flux of the second polarity in the first member and in which a sixth magnetic member corresponds to the fifth magnetic member and in which a sixth plurality of windings is coupled magnetically to the sixth magnetic member and is connected in electrical circuits corresponding to the windings in the fifth plurality and in which signals induced in a winding in the sixth plurality corresponding to the third winding in the fifth plurality are introduced to the second winding in the third plurality and in which the first windings on the different members are connected in electrical circuits with the intermittent signal means to obtain the introduction of signals of the first polarity to the first windings on the first, second and fifth members at the same time as the introduction of signals of the second polarity to the first windings on the third, fourth and sixth members and vice versa.

References Cited in the file of this patent

UNITED STATES PATENTS

| | | |
|---|---|---|
| 2,524,154 | Wood | Oct. 3, 1950 |
| 2,591,406 | Carter | Apr. 1, 1952 |
| 2,673,337 | Avery | Mar. 23, 1954 |

OTHER REFERENCES

Publication: "Magnetic Cores as Elements of Digital Computing Systems," (Haynes), thesis dated December 28, 1950 (pages 33–35 and Figure 25, page 34, relied on).

"Magnetic Binaries in the Logical Design of Information Handling Machines," (Saunders), Proceedings of Association for Computing Machinery, May 19, 1952, page 226.